(12) United States Patent
Rohrbach et al.

(10) Patent No.: US 6,379,564 B1
(45) Date of Patent: Apr. 30, 2002

(54) MULTI-STAGE FLUID FILTER, AND METHODS OF MAKING AND USING SAME

(76) Inventors: Ronald Paul Rohrbach, Honeywell International Inc. 101 Columbia Rd., Morristown, NJ (US) 07962; Gordon William Jones, Honeywell International Inc. 1600 N. Union St., P.O. Box 880, Fostoria, OH (US) 44830; Peter D. Unger, Honeywell International Inc. 101 Columbia Rd., Morristown, NJ (US) 07962; Daniel E. Bause, Honeywell International Inc. 101 Columbia Rd., P.O. Box 1057, Morristown, NJ (US) 07962-1057; Lixin L. Xue, 14307 Hunt Gate Woods Rd., Midlothian, VA (US) 23112; Russell A. Dondero, 327122 Georgia Tech Station, Atlanta, GA (US) 30332

( * ) Notice: Subject to any disclaimer, the term of this patent is extended or adjusted under 35 U.S.C. 154(b) by 0 days.

(21) Appl. No.: 09/566,035

(22) Filed: May 8, 2000

(51) Int. Cl.$^7$ ............................. B01D 37/00; B01D 39/00
(52) U.S. Cl. ..................... 210/765; 210/209; 210/252; 210/314; 210/505; 210/508
(58) Field of Search ................................. 210/765, 805, 210/198.1, 209, 252, 256, 314, 323.1, 346, 347, 435, 500.23, 503, 505, 508, 908

(56) References Cited

U.S. PATENT DOCUMENTS

| | | |
|---|---|---|
| 4,075,098 A | 2/1978 | Paul et al. |
| 4,130,487 A * | 12/1978 | Hunter et al. |
| 4,329,226 A * | 5/1982 | Thompson |
| 4,557,829 A | 12/1985 | Fields |
| 4,886,599 A | 12/1989 | Bachmann et al. |
| 5,017,285 A | 5/1991 | Janik et al. |
| 5,042,617 A | 8/1991 | Brownawell et al. |
| 5,057,368 A | 10/1991 | Largman et al. |
| 5,069,799 A | 12/1991 | Brownawell et al. |
| 5,069,970 A | 12/1991 | Largman et al. |
| 5,076,920 A | 12/1991 | Danowski et al. |
| 5,225,081 A | 7/1993 | Brownawell |
| 5,478,463 A | 12/1995 | Brownawell et al. |
| 5,552,040 A | 9/1996 | Baeler et al. |
| 5,713,971 A | 2/1998 | Rohrbach et al. |
| 5,759,394 A | 6/1998 | Rohrbach et al. |
| 5,766,449 A | 6/1998 | Davis |
| 5,902,384 A | 5/1999 | Rohrbach et al. |

* cited by examiner

Primary Examiner—Betsey Morrison Hoey

(57) ABSTRACT

A fluid filter increases the useful life of the filtered fluid by removing contaminants therefrom, and may optionally provide for in-line delivery of additives to the filtered fluid. The filter may be an oil filter, a fuel filter, or other fluid filter. The fluid filter includes a casing which defines a hollow space therein, a mechanically active filter element within that space, and a chemically active filter element also retained within the hollow space proximate the mechanically active filter element. The chemically active filter element includes a nonwoven web made up of a plurality of fibers. Each fiber has a longitudinally extending internal cavity formed therein, and a corresponding longitudinally extending slot opening from that internal cavity to the outer surface of the fiber. Preferably each fiber as multiple lobes extending radially outwardly from a central stem, and each lobe cooperates with an adjacent lobe to define a longitudinally extending internal cavity and a corresponding slot therebetween. In order to remove contaminants or to supply additives to lubricating oil, the internal cavities, of each of the chemically active filter fibers, are supplied with a chemical reagent therein.

22 Claims, 11 Drawing Sheets

MULTI-STAGE FLUID FILTER, AND METHODS OF MAKING AND USING SAME

BACKGROUND OF THE INVENTION

1. Field of the invention

The present invention relates to fluid filters, and to specific applications thereof More particularly, the present invention relates to multi-stage fluid filters containing a mechanically active filter element for straining impurities out of fluid as it passes therethrough, and a chemically active filter element made of fibers impregnated with one or more chemical reagents, to chemically interact with a fluid passing therethrough. The chemical reagents in the chemically active filter element may work to reduce contaminants by precipitating those contaminants out of solution in the fluid, may release a beneficial reagent into such fluid, may react with and immobilize deleterious components, or may perform all of these functions in a single filter apparatus.

2. Description of the Relevant Art

Many different types of fluid filters are known. Most such filters use a mechanical or 'screening' type of filtration, with a replaceable cartridge having a porous filter element therein.

In the oil filtration art, it is well known that normal operation of an internal combustion engine, particularly a diesel engine, results in the formation of contaminants. These contaminants include, among others, soot, which is formed from incomplete combustion of the fossil fuel, and acids that result from combustion. Both of these contaminants are typically introduced into the lubricating oil during engine operation, and tend to alter oil viscosity and to generate various engine deposits, leading to increased engine wear.

The conventional solution to these problems has been to place various additives into lubricating oils. In order to combat soot-related problems, most conventional lubricating oils include dispersants that resist agglomeration of soot therein. These work well for a short period, but may become depleted. Additionally, due to the solubility and chemical stability limits of these dispersants in the oil, the service lives of the lubricating oil and the oil filter are less than optimal.

For combating combustion acid related problems, many conventional systems include neutralizing additives known as over-based detergents. These are source of TBN (total base number), which is a measure of the quantity of the over-based detergent in the oil. The depletion of the TBN is an important limiting factor for many internal combustion engines, and in particular for heavy-duty applications with diesel engines.

In order to improve engine protection and to combat other problems, conventional lubricating oils often include one or more further additives, which may be corrosion inhibitors, antioxidants, friction modifiers, pour point depressants, detergents, viscosity index improvers, antiwear agents, and/ or extreme pressure additives. The inclusion of these further additives may be beneficial; however, with conventional methods, the amount and concentration of these additives are limited by the ability of lubricating oils to suspend these additives, as well as by the chemical stability of these additives in the oil.

Other solutions have been proposed in addition to the conventional method of mixing additives with lubricating oil. For example, in order to combat the build up of sludge in oil, U.S. Pat. No. 5,478,463, issued in 1995 to Brownawell et al, and entitled Method of Reducing Sludge and Varnish Precursors in Lubricating Oil; and U.S. Pat. No. 5,042,617, issued in 1991 to Brownawell, and entitled Method of Reducing the Presence of Sludge in Lubricating Oils, each disclose an oil filter and method for reducing the amount of sludge in lubricating oil as it circulates throughout an engine. These Brownawell patents provide for the inclusion of particles in an oil filter that are oil insoluble and oil wettable, and which complex with sludge such that at least some of the sludge that these particles come into contact with is immobilized on the particles. The Brownawell '617 patent discloses the inclusion of oil insoluble and oil wettable particles in an oil filter that are retained on a pelletized substrate, whereas the Brownawell '463 patent discloses the inclusion of such particles that are not retained on a substrate, but are nonetheless retained in the oil filter.

Another Brownawell patent, which relates to the reduction of combustion acids in lubricating oil, is U.S. Pat. No. 5,069,799 issued in 1991 and entitled Method For Rejuvenating Lubricating Oils. This Brownawell patent discloses an oil filter and method for reducing the Amount of combustion acids in lubricating oil. In particular, it discloses a method of rejuvenating Lubricating oil, which includes reduction of combustion acids, by serially passing the oil through first a chemically active filter media, then a physically active filter media, and finally an inactive filter media. In this '799 patent, the chemically active filter media includes a strong base, to displace weak bases that have combined with combustion acids. The combustion acid and the strong base then combine to form a salt, which is then physically trapped by subsequent mechanical filter media.

U.S. Pat. No. 5,225,081 to Brownawell discloses method of removing polynuclear aromatics from used lubricating oil. The method of the Brownawell '081 reference involves passing oil through a staged oil filter system, which may include a chemically active filter media. The chemically active filter media is made of a composite material including particles of an active component and a and a thermoplastic binder, which are a product of a heated extrusion process. Basic materials are given as one example of materials suitable for use as materials usable as chemically active filter media. Activated carbon is also emphasized as a preferred component of the filter media.

Some designs for multiple stage oil filters are known such as those disclosed in U.S. Pat. No. 4,557,829 and 4,886,599. U.S. Pat. No. 4,886,599 to Bachmann et al. discloses a filter cartridge with sequential concentric cylindrical filter elements, for both chemical and mechanical filtration of oil contained in an oil-sealed vacuum pump.

Other designs for oil filters that contain extra additives and dispense those additives into oil, over time, are disclosed in U.S. Pat. No. 4,075,098 and 5,552,040.

Many patents have been issued for fuel filters, including 5,017,285, 5,076,920, and 5,766,449.

Although they are useful for their intended purposes, conventional fluid filters have several shortcomings. A need still exists in the art for an improved fluid filter that increases the useful life of a filtered fluid by removing contaminants therefrom, in a way that is superior to the previously known methods. A need also exists for an improved fluid filter including a mechanism that provides for better in-line delivery of additives than the known filter designs.

SUMMARY OF THE INVENTION

The present invention has been developed to overcome the foregoing limitations and disadvantages of conventional staged fluid filters, and other proposed methods for increasing the useful life of lubricating oil and protecting the engine. The present invention, generally, provides a fluid filter that increases the usefull life of the filtered fluid by removing contaminants therefrom, by modifying the filtered fluid, and/or by optionally providing in-line delivery of additives to the filtered fluid.

According to a first embodiment of the invention there is provided a fluid filter that includes a casing which defines a hollow space therein, a mechanically active filter element within that space, and a chemically active filter element also retained within the hollow space. The mechanically active filter element may be a conventional paper filter element. An intermediate member may, optionally, be provided to separate the mechanically active filter element from the chemically active filter element within the chamber.

In a second embodiment of the invention, a filter assembly in accordance with the invention may include a first casing having a mechanically active filter member therein, and a supplemental cartridge including a second casing housing a chemically active filter element.

The chemically active filter element includes a nonwoven web made up of a plurality of fibers. Each fiber has a longitudinally extending internal cavity formed therein, and a corresponding longitudinally extending slot opening from that internal cavity to the outer surface of the fiber. Preferably each fiber has three lobes and each lobe has a longitudinally extending internal cavity and a corresponding slot defined on each side thereof, in cooperation with the adjacent lobe.

In order to remove contaminants or to supply additives to lubricating oil, the internal cavities, of each of the chemically active filter fibers, are supplied with a chemical reagent therein.

The fluid filter according to the invention may take the form of an oil filter. In a first preferred embodiment of the invention, a staged oil filter is adapted to remove contaminants from lubricating oil, when the oil circulates therethrough. Oil passes through the nonwoven web of fibers by traveling along the spaces between the fibers. As the oil moves along the fibers, it communicates with the reagents retained within the fiber cavities through the longitudinal openings of each fiber. As the reagents communicate with the lubricating oil, they react with the oil to precipitate soot, neutralize combustion acids, or adsorb contaminants, in accordance with the nature of the reagent.

In the case of supplying additives to the oil, the reagent either reacts with the oil to slowly release a particular additive, or the reagent is substantially miscible with lubricating oil, and mixes with the oil as the oil passes through the nonwoven web. Alternatively, the fiber material may incorporate a polymeric network, which includes a lubricating oil reagent or additive. Such a polymeric network may include polymeric particles with an additive chemically associated therewith, the particles being housed within the internal fiber cavities, or alternatively, the polymeric material making up the fibers may have a releasable reagent chemically associated therewith. Where a polymeric network is used, as the oil passes through the web, it communicates with the fiber material, and thereby reacts with the polymeric network and reagent.

The chemical reagent may be in liquid or solid form, but it preferably consists of solid particles. In liquid form, the lobes of each fiber are sized such that the liquid reagent is retained by capillary forces, and as solid particles, the reagent is physically entrained within the lobes of the fibers.

In order to precipitate soot within lubricating oil, the reagent preferably includes a compound selected from the group consisting of organic salts, inorganic salts, surfactants, alcohols, poly-alcohols, poly-glycols, amines, polyamines, polyimines, morpholines, oxazoline, polyether, and piperazine.

In order to neutralize acid, the reagent preferably includes a compound selected from the group consisting of calcium carbonate, sodium carbonate, magnesium carbonate, calcium hydroxide, sodium hydroxide, magnesium hydroxide, calcium oxide, magnesium oxide, zinc oxide, barium oxide, and sodium aluminate.

In order to supply additives to lubricating oil, the reagent preferably includes a compound selected from the group consisting of dispersants, antioxidants, friction modifiers, pour point depressants, corrosion inhibitors, detergents, viscosity index improvers, antiwear agents, and extreme pressure additives, and mixtures thereof.

In another embodiment of the invention, the staged fluid filter hereof may be provided in the from of a fuel filter. The fuel filter may include a fiber web with a reagent selected to bind and remove water from fuel, a fiber web with a reagent which is released over time as a beneficial fuel additive, or both of these webs.

It is an object of the present invention to provide an improved fluid filter, which is usable to reduce an amount of soot, water or other contaminants present in a filtered fluid.

It is a further object of the present invention to provide an improved fluid filter, which includes a material which is able to react with and neutralize acids within a filtered fluid.

It is another object of the present invention to provide an improved fluid filter, which provides for the in-line delivery of beneficial additives to a filtered fluid.

For a more complete understanding of the present invention, the reader is referred to the following detailed description section, which should be read in conjunction with the accompanying drawings. Throughout the following detailed description and in the drawings, like numbers refer to like parts.

DETAILED DESCRIPTION OF THE PREFERRED EMBODIMENTS

Overview

Figure 1:
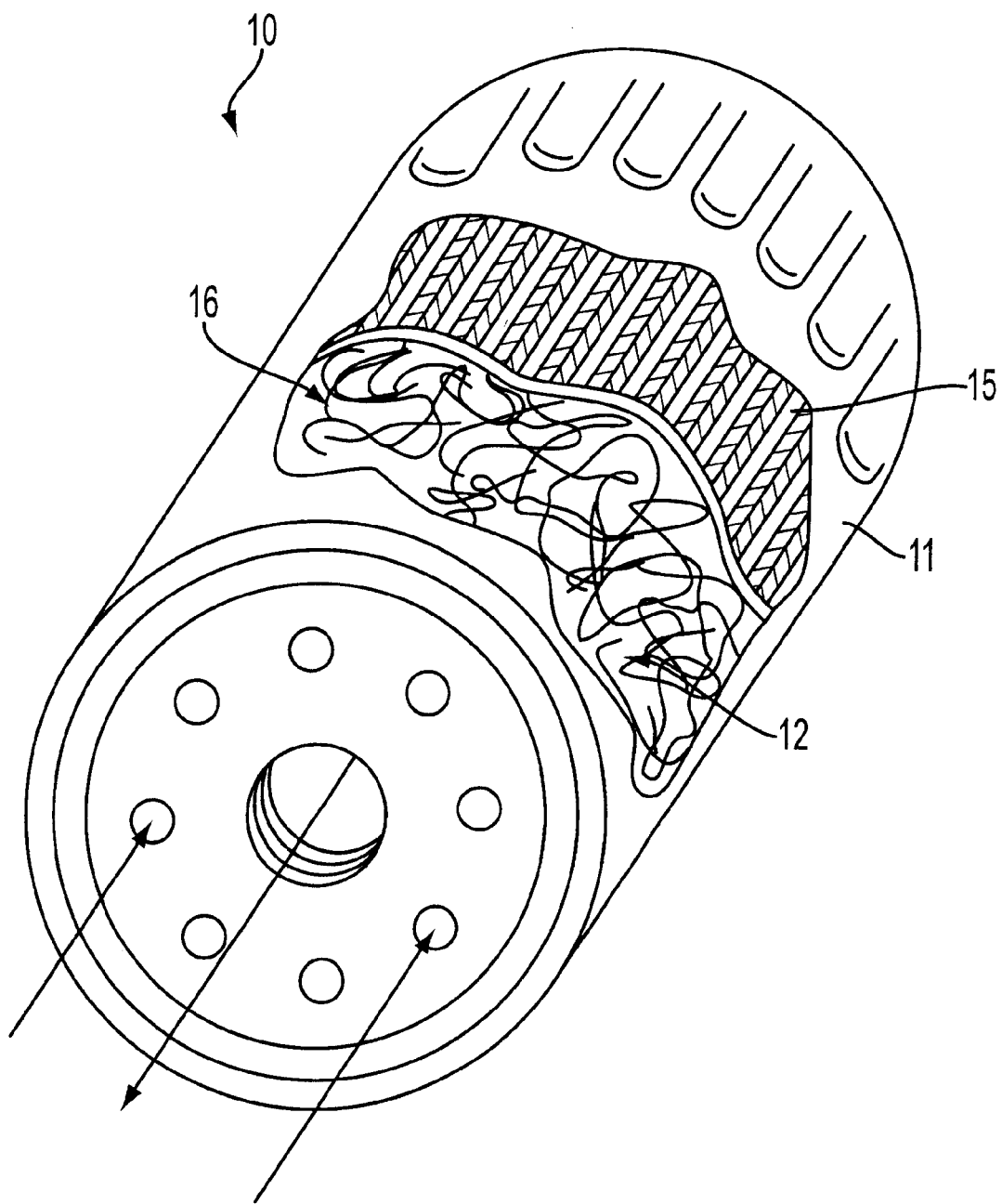
FIG. 1 is a perspective view, partially cut away, of an oil filter in accordance with a first embodiment of the invention.
Figure 2:
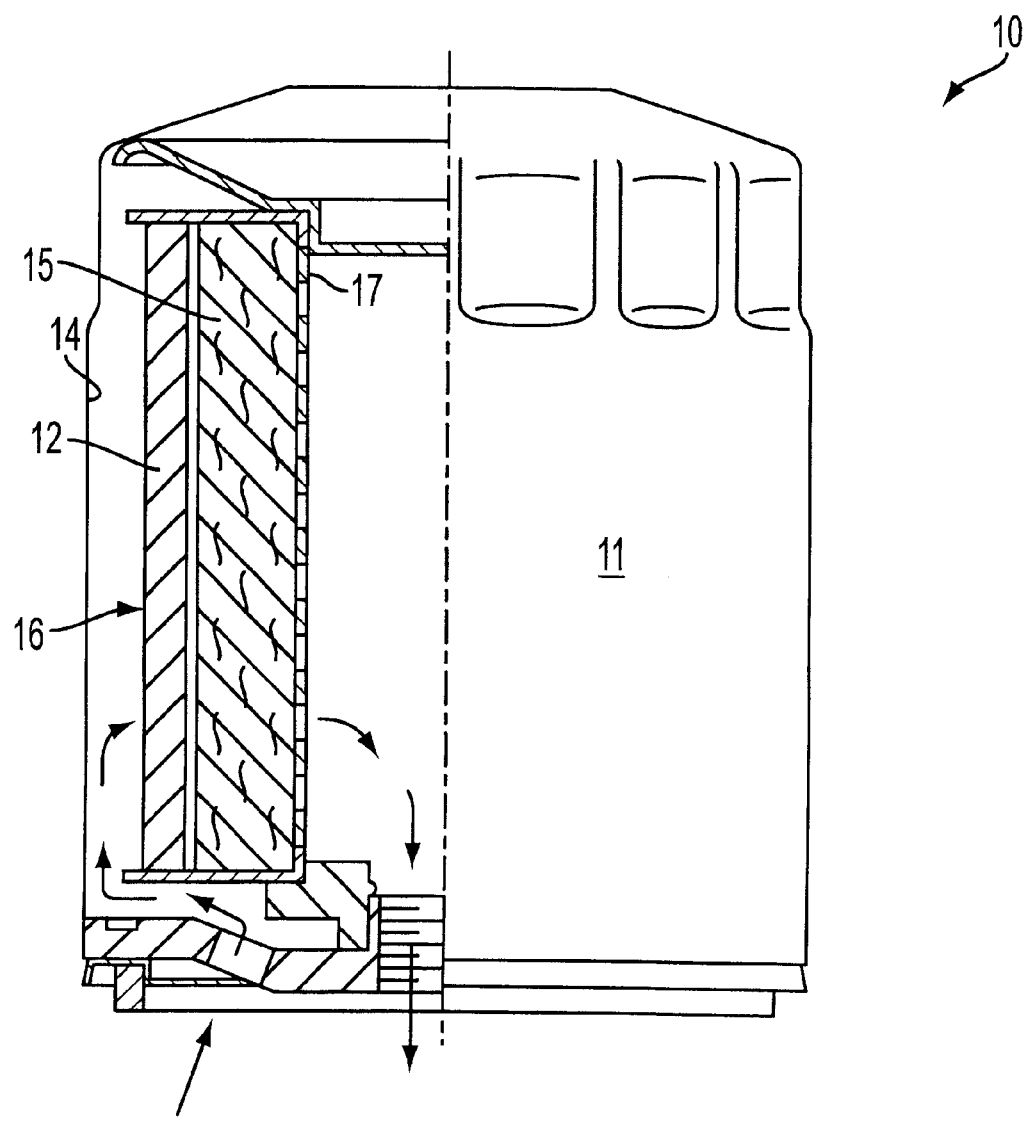
FIG. 2 is a side plan view, partially in cross-section, of the oil filter of FIG. 1, showing the direction of fluid flow into and through the oil filter.

Referring to FIGS. 1 and 2, there is shown an oil filter 10 according to a first preferred embodiment of this invention. The oil filter 10 generally includes a casing 11 which defines a hollow space 14 therein, a porous mechanically active filter element 15 within that space, and a chemically active filter element 16, made up of a nonwoven fiber web 12 also retained within the hollow space. A base plate of the casing 11 includes a plurality of inlet ports formed therethrough and arranged in a circular pattern. The base plate also includes a central outlet port. The outlet port has a plurality of female threads formed therein to allow rotatable mounting of the filter 10 on an externally threaded hollow tubular fitting on an engine block (not shown). An annular external sealing member fits engagingly into a groove formed at the bottom surface of the base plate, to resist oil leakage outwardly from the base of the filter.

Throughout the present specification, relative positional terms like 'upper','lower','top', 'bottom','horizontal', 'vertical', and the like are used to refer to the orientation of the filters shown in the drawings. These terms are used in an illustrative sense to describe the depicted embodiments, and are not meant to be limitative. It will be understood that in a specific application thereof, a filter may be installed on an engine in an orientation different from that shown in the drawings, such as inverted 180 degrees or transverse to that shown, and in such a case, the above-identified relative positional terms will no longer be accurate.

First Preferred Embodiment

In the depicted embodiment 10, the mechanically active filter element 15 is a conventional cylinder made of accordion-pleated filter paper, and the chemically active filter element 16 is also cylinder which is disposed radially and coaxially outside of the mechanically active filter element 15. A foraminous cylindrical support frame 17 may, optionally, be provided within the casing 11 to, supportively hold the filter elements 15, 16 therein. The direction of oil flow, through the filter 10, is shown by the arrows in FIG. 2.

The oil filter 10 may include a flexibly resilient sealing member having an integral pressure relief valve therein, such as that disclosed in co-pending U.S. Pat. application Ser. No. 09/271,137, filed Mar. 17, 1999, now U.S. Pat. No. 6,214,215 the disclosure of which is incorporated by reference. Alternatively, the oil filter may incorporate a spring-loaded or other conventional pressure relief valve of a type known to those in the art.

The casing 11 preferably includes a thin-walled metal cylinder having closed ends thereon, as is common in the industry for oil filters. It may however have almost any configuration, provided it retains a nonwoven fiber web 12 and a porous mechanical mechanically active filter element 15, and directs lubricating oil through both the chemical and mechanical filter elements.

In the embodiment of FIGS. 1–2, the fiber web 12 of the chemically active filter element 16 is located external to the mechanically active filter element 15, in order to trap and capture contaminants such as soot particles (not shown) on the external surface thereof, before oil reaches the mechanically active filter element, and to retain the trapped contaminants thereon, while maximizing the surface area thereof.

Any suitable material may also be used for the mechanically active filter element 15, such as a conventional accordion-pleated paper oil filter element, provided that it selectively filters particles, larger than a specified size, out of lubricating oil circulated therethrough.

The Wicking Fibers

As noted, the chemically active filter element 16 takes the form of a nonwoven fiber web 12, which is retained in the casing 11. The fiber web 12 is formed from a multiplicity of intertwined wicking fibers 20, as shown in FIGS. 3 through 6, containing a reagent selected for its capacity to react with the specific fluid being filtered, so as to provide an additive thereto and/or to remove unwanted materials such as contaminants therefrom.

Figure 3:
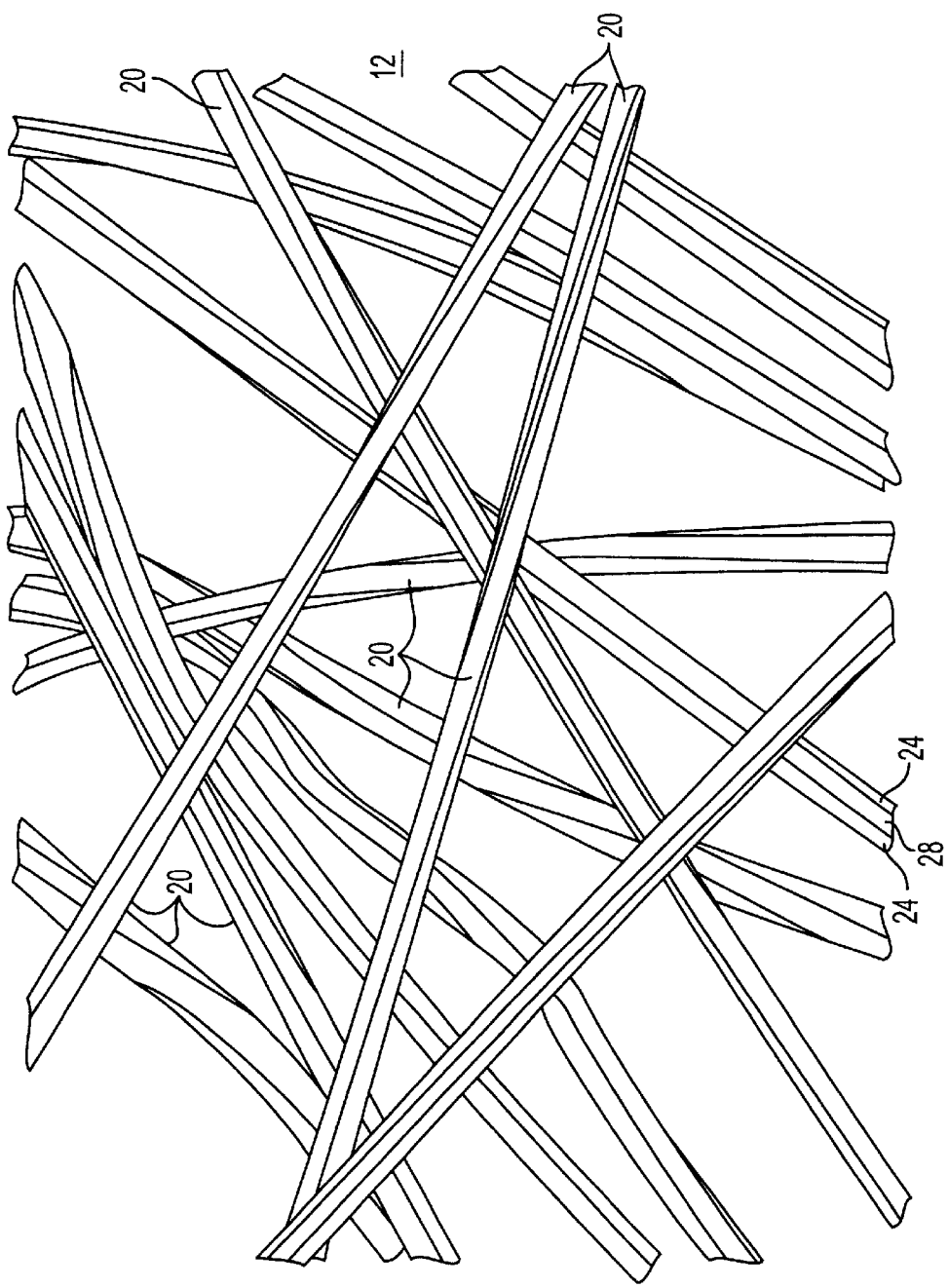
FIG. 3 is an enlarged perspective detail view of a nonwoven mat formed of wicking fibers according to the present invention.
Figure 4:
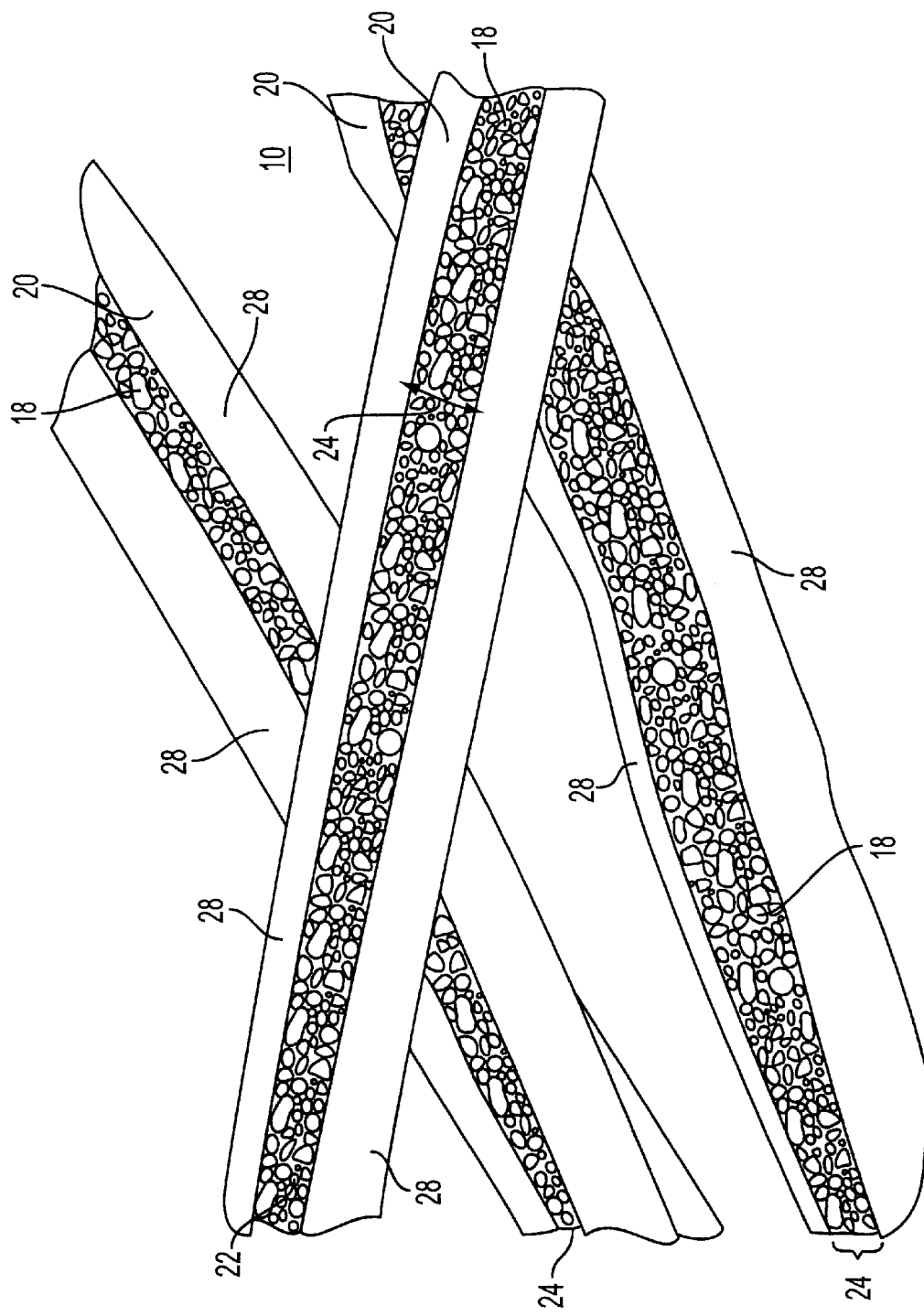
FIG. 4 is a further enlarged perspective detail view of the nonwoven fiber mat of FIG. 3, showing a solid component entrained in cavities of the fibers.
Figure 5:
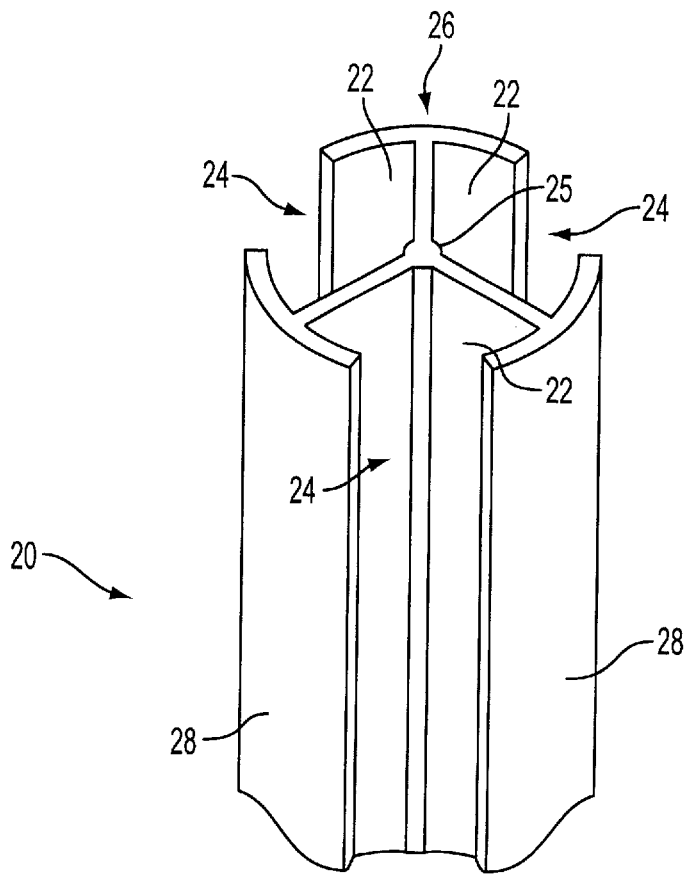
FIG. 5 is an enlarged perspective view of a three-lobed wicking fiber, which is usable in the practice of the present invention.
Figure 6:
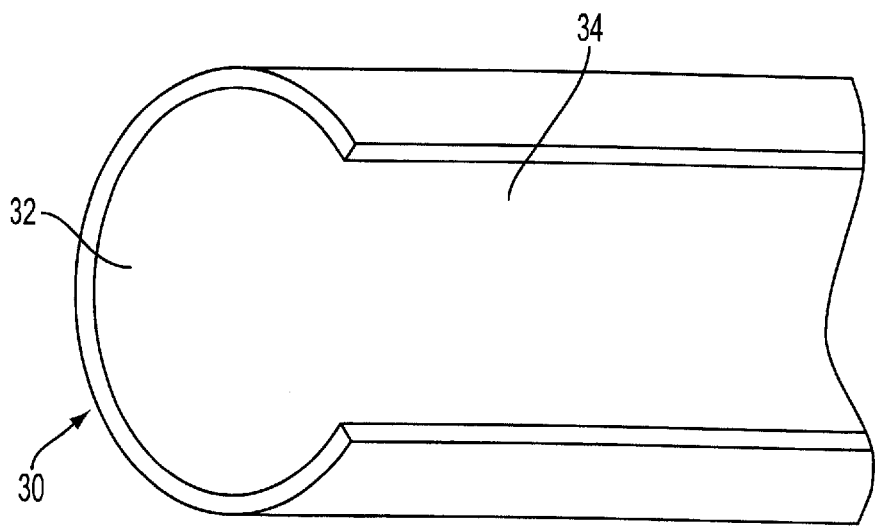
FIG. 6 is an enlarged perspective view of an alternative wicking fiber which is usable in the practice of the present invention, having a C-shaped cross-section with a single cavity formed therein.

FIGS. 3–5 show the fibers 20 making up the web 12 in an increasing level of detail and magnification in each succeeding figure. FIG. 3 shows a detail view of a number of the intertwined fibers 20 making up the web 12. FIG. 4 shows a further magnified detail view of the fibers 20, and also shows a number of solid particles 18 as one example of a reagent which may be disposed therein. FIG. 5 is a close-up detail perspective view of an end of one preferred fiber 20, with the reagent deleted from the drawing for purposes of illustration, and FIG. 6 shows an alternative configuration for a fiber 30 which is usable in the practice of the present invention.

A wicking fiber that is particularly suitable for practicing this invention is disclosed in U.S. Pat. No. 5,057,368, the disclosure of which is incorporated by reference. This patent discloses a fiber formed from thermoplastic polymers, wherein the fiber has a cross-section with a central core or stem 25, and a plurality of substantially T-shaped lobes 26 (FIG. 5). The legs of the lobes 26 intersect at the core 25 so that the angle between the legs of adjacent lobes is from about 80 degrees to 130 degrees. The thermoplastic polymer is typically a polyamide, a polyimide, a polyester, a polyolefin, a polysulfone, or a combination thereof. The wicking fiber as illustrated in FIG. 5 is formed as an extruded strand having three hollow longitudinally extending interior cavities 22, each of which communicates with the outer strand surface by way of longitudinally extending slots 24 defined between adjacent lobes 26.

The wicking fibers 20 are relatively small, having a diameter in a range between 30 and 250 microns. The width of the longitudinal extending slots 24 is normally less than one half of the diameter of the fibers 20.

Referring now to FIGS. 4 and 5, the fiber 20, the width of the slots 24, and the particles 18 to be entrapped within the interior cavities 22 are selected so that when the particles 18 are forced into the longitudinal cavities 22 they are retained therein. The small solid particles 18 become mechanically trapped within the longitudinal cavities 22 of the fibers 20, and are retained therein. This approach can be extended to substantially any powder, or other finely divided solid material, which one would like to entrap within a fiber medium. After the fine solid particles are entrapped, the wicking fiber 20 may additionally be impregnated with a liquid reagent. Alternatively, the wicking fiber may be impregnated solely with a liquid reagent.

The capillary forces within the individual cavities 22 are much greater than those external to the fiber 20, such that a liquid reagent is readily wicked up within the interior of the fiber 20 without appreciable wetting of the external surfaces 28 or filling the inter fiber voids. The fibers 20 strongly retain the liquid through capillary action, so that the nonwoven web 12 is not wet to the touch, and the liquid will not shake off. In a nonwoven web 12 of such wicking fibers 20 the area between the individual strands remains relatively free of the fine particles 18, and of any liquid reagent with which the internal cavities 22 of each fiber 20 are filled.

The fibers 20 may be made of one or more type of wicking material strands such as polyamides, polyimides, polyesters, polysulfones, polyolefins, or other suitable polymeric material which may be formed into the desired configuration, and which is stable with respect to the reagent stored therein and the fluid being filtered therethrough. The three cross-sectionally T-shaped segments may have their outer surface 28 curved, as shown, or straight. While the wicking fiber 20 is depicted as tri-lobed in FIG. 5, it will be understood that any other number of lobes are suitable, particularly two, four or five lobes.

In addition other internal wicking fibers may be used, such as the C-shaped fiber shown in FIG. 6, having a single longitudinal extending slot 34, and a single longitudinally extending cavity 32. Other cross-sectional shapes may also be suitable for retaining reagents therein. The specific shape of the wicking fibers is not critical, so long as the fibers selected can hold the reagent within its cavities 22 such that it is not easily displaced.

The Reagent

In the embodiment of FIGS. 1–2, the reagent includes acid neutralizing agents, soot precipitating reagents, or a combination thereof It is appreciated that it may also contain alone or in combination many other reagents for removing various contaminants or otherwise affecting lubricating oil. These other reagents may include, for example, activated carbon for adsorbing various contaminants, zeolites including modified forms thereof, other high surface area sorbents including surface modified sorbents, or combinations of the above.

Suitable acid neutralizing agents may include basic salts, such as one or more reagents selected from the group consisting of calcium carbonate, sodium carbonate, magnesium carbonate, calcium hydroxide, sodium hydroxide, magnesium hydroxide, calcium oxide, magnesium oxide, zinc oxide, barium oxide, sodium aluminate, or any other acid neutralizing agent, or combination thereof Where used, the acid neutralizing agents are preferably in granular form, but it is appreciated that such agents may be in a liquid form retained within the fibers by capillary forces, or in a combination thereof.

The soot precipitating agents possess high binding activity to soot particles and low solubility with oil, and may include one or more reagents selected from the group consisting of organic salts, inorganic salts, surfactants, alcohols, poly-alcohols, poly-glycols, amines, polyamines, polyimines, morpholines, oxazoline, polyether, or piperazine, or any other soot precipitating agent, or combination thereof. The soot precipitating agents are also preferably in granular form, but it is appreciated that such agents may also be in a liquid form retained within the fibers by capillary forces, or in a combination thereof.

Operation

In order to remove contaminants, the contaminated lubricating oil is directed through the nonwoven web 12 formed from the wicking fibers 20 into contact with the fine particles 18 or other reagent, wherein the contaminants communicate with the reagents through the openings 24. For removing soot contaminants from lubricating oil, as the soot particles communicate with the soot precipitating reagent through the openings 24, soot particles precipitate onto the surfaces of the reagent particles 18, the fibers 20, or are filtered by the mechanically active filter element 15. As soot is removed from the lubricating oil by passing through the oil filter 10, the precipitation of soot continuously restores the dispersing function of any dispersant additives mixed with the oil. As a result, fewer dispersants, if any, are required to prolong the useful life of lubricating oil.

For removing acid contaminants from lubricating oil, as acid contaminants communicate with the acid neutralizing reagent through the openings 24, the acid is neutralized. The neutralizing of acid results in the formation of salts, which are subsequently filtered by the mechanically active filter element 15. The acid-neutralizing reagent prolongs the usefull life of oil by reducing the depletion rate of any TBN (total base number) additives, and also decreasing the rise rate of the total acid number (TAN).

Second Preferred Embodiment

In Line Delivery of Additives

Figure 7:
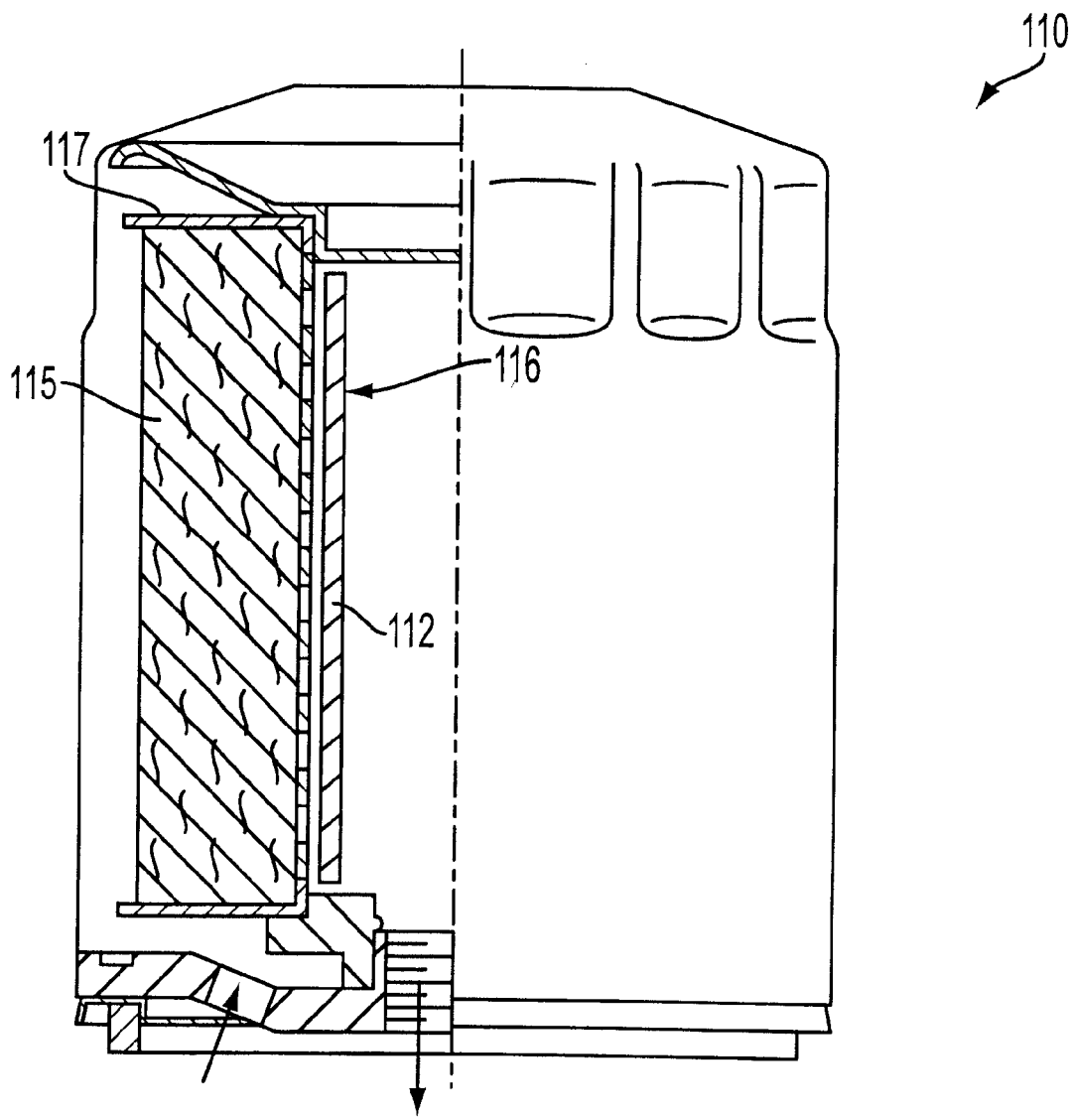
FIG. 7 is a side plan view, partially in cross-section, of an oil filter according to a second embodiment of the invention.

Referring now to FIG. 7, an oil filter in accordance with a second preferred embodiment of the invention is shown generally at 110. In the embodiment of FIG. 7, the oil filter 110 is substantially identical to the oil filter 10 of the first embodiment, except that in this second embodiment, the fiber web 112 of the chemically active filter element 116 is located radially internally within the mechanically active filter element 115, and is also coaxially mounted radially inside of and attached to the frame member 117, in order to most effectively release a chemical additive from the fiber web 112 into the liquid being filtered. Locating the chemically active filter element 116 in this way minimizes the likelihood that the released additive will be removed by the mechanically active filter element 115 immediately after its release.

In this embodiment of the filter 110, the fiber web 112 is substantially identical to the fiber web 12 of the first embodiment as described herein, except for the location thereof within the filter, and the specific reagent selected to be placed within the fibers 20 thereof The second preferred embodiment differs from the first preferred embodiment in the nature and type of reagent particles 18 retained in the fibers 20 of the nonwoven fiber web 112. Except for preferences and aspects related to the in-line delivery of additives and the associated reagent, all other preferences and aspects are the same as the first preferred embodiment.

The reagent is preferably retained within the longitudinal cavities 22 of wicking fibers 20; however, a reagent may also be entrapped in a polymeric network within the fiber material itself The reagents in this embodiment release agents into the lubricating oil, and include one or more compounds selected from the group consisting of dispersants, antioxidants, friction modifiers, pour point depressants, corrosion inhibitors, detergents, viscosity index improvers, antiwear agents, extreme pressure additives, and mixtures thereof These reagents are preferably substantially miscible with oil, but they may also react with oil or substances contained therein to release a desired agent. These reagents are also preferably in granular form, but it is appreciated that such agents may be in a liquid form retained within the fibers by capillary forces, or in a combination thereof It is also appreciated, that a plurality of different reagents may be incorporated in the nonwoven web 112, by impregnating different groups of fibers 20 with different reagents, by providing the reagent as a mixture of different additive agents, by entrapping various agents in a polymeric network within the material making up the fibers, or by a combination thereof The additives are released as the lubricating oil is directed through the nonwoven web 112 formed from the wicking fibers 20, and contacts the fine particles 18 or other reagent. As the lubricating oil contacts the wicking fibers 20, the oil and substances contained therein communicate with the reagent through the openings 24, or in the case of a polymeric network within the fibers, communicate with the reagents as the oil contacts the fiber surface 28. The preferred reagents used as additives are substantially miscible with oil, and mix with the lubricating oil as it contacts the reagent.

In order to reduce the likelihood of the mechanically active filter element 15 from filtering out reagent particles 18 mixed with the oil, in an application where the chemically active filter element 116 is adapted to release an additive into the oil, the nonwoven fiber web 112 is preferably located downstream from the mechanically active filter element 115 within the oil filter 110, as shown. The in-line delivery of these agents within the oil filter reduces the need for additives being mixed with oil in advance of use, and also allows for the addition of additives over time to replace used additives, and thereby further protect the engine or other lubricated components, and increase the useful life of lubricating oil.

Third Preferred Embodiment

Figure 8:
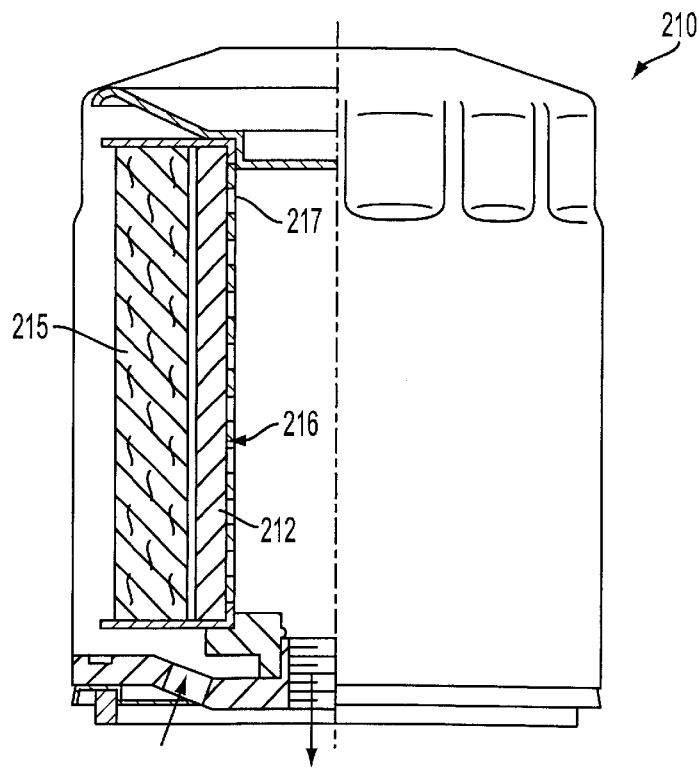
FIG. 8 is a side plan view, partially in cross-section, of an oil filter according to a third embodiment of the invention.

Referring now to FIG. 8, an oil filter in accordance with a third preferred embodiment of the invention is shown generally at 210. Except as specifically discussed herein or as shown differently in the drawings, the filter 210 in this third embodiment is substantially identical to the oil filter 10 of the first embodiment, as previously discussed herein.

In the embodiment of FIG. 8, the oil filter 210 is substantially identical to the oil filter 110 of the second embodiment, except that in this third embodiment, the fiber web 212 of the chemically active filter element 216 is located between the mechanically active filter element 215 and the frame member 217, in order to release a chemical additive from the fiber web 212 into the liquid being filtered, yet still obtain the maximum possible support from the frame member 217. Locating the chemically active filter element 216 in this way reduces the likelihood that the released additive will be removed by the mechanically active filter element 215, as compared to the arrangement of FIGS. 1–2, but provides more support for the chemically active filter element 216 than the embodiment of FIG. 7. The reagents used in this embodiment are the same lubricant additives as those discussed above in connection with the second embodiment 110.

Fourth Preferred Embodiment

Figure 9:
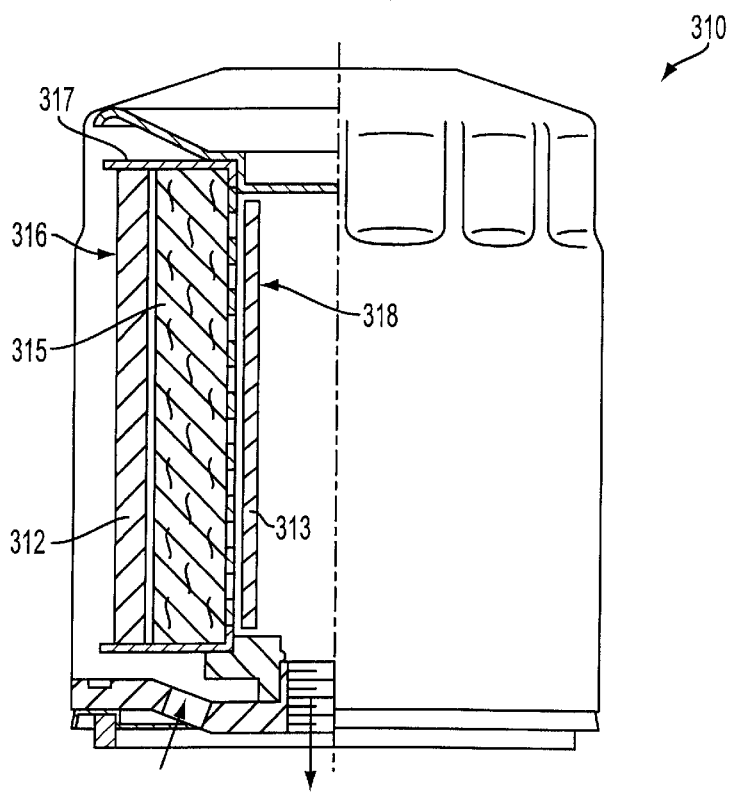
FIG. 9 is a side plan view, partially in cross-section, of an oil filter according to a fourth embodiment of the invention.

Referring now to FIG. 9, an oil filter in accordance with a fourth preferred embodiment of the invention is shown generally at 310. Except as specifically discussed herein or as shown differently in the drawings, the filter 310 in this fourth embodiment is substantially identical to the oil filter 10 of the first embodiment, as previously discussed herein.

The oil filter 310 in this embodiment includes a first chemically active filter element 316 which is substantially identical to the single chemically active filter element 16 in the embodiment of FIGS. 1–2 as discussed herein, and is provided for the same purposes, i.e., to provide acid neutralizing agents and/or to provide soot removing reagents. The reagents used in the first chemically active filter element 316 in this embodiment are the same as the reagents discussed above in connection with the first embodiment.

In the embodiment of FIG. 9, the oil filter 310 is substantially identical to the oil filter 10 of the first embodiment, except that in this fourth embodiment, in addition to the first chemically active filter member 316 made up of the first fiber web 312, a second chemically active filter element filter element 318, made up of a second fiber web 313, is also provided so that the filter becomes a three stage filter. In this embodiment, the second chemically active filter element is located coaxially and radially internally within the mechanically active filter element 315. The second fiber web 313 is also located radially inside of, and attached to the frame member 317, in order to most effectively release a chemical additive therefrom, into the liquid being filtered. Locating the second chemically active filter element 318 in this way minimizes the likelihood that the released additive will be removed by the mechanically active filter element 315. The reagent is preferably retained within the longitudinal cavities 22 of wicking fibers 20; however, a reagent may also be entrapped in a polymeric network within the fiber material itself The reagents within the second chemically active filter element 318, in this embodiment, release additives into the lubricating oil, and include one or more compounds selected from the group consisting of dispersants, antioxidants, friction modifiers, pour point depressants, corrosion inhibitors, detergents, viscosity index improvers, antiwear agents, extreme pressure additives, and mixtures thereof These reagents are preferably substantially miscible with oil, but they may also react with oil or substances contained therein to release a desired agent. These reagents are also preferably in granular form, but it is appreciated that such agents may be in a liquid form retained within the fibers by capillary forces, or in a combination thereof It is also appreciated, that a plurality of different reagents may be incorporated in the nonwoven web 313, by impregnating different groups of fibers 20 with different reagents, by providing the reagent as a mixture of different additive agents, by entrapping various agents in a polymeric network within the material making up the fibers, or by a combination thereof The additives are released as the lubricating oil is directed through the nonwoven web 313 formed from the wicking fibers 20, and contacts the fine particles 18 or other reagent. As the lubricating oil contacts the wicking fibers 20, the oil and substances contained therein communicate with the reagent through the openings 24, or in the case of a polymeric network within the fibers, communicate with the reagents as the oil contacts the fiber surface 28. The preferred reagents used as additives are substantially miscible with oil, and mix with the lubricating oil as it contacts the reagent.

Fifth Preferred Embodiment

Figure 10:
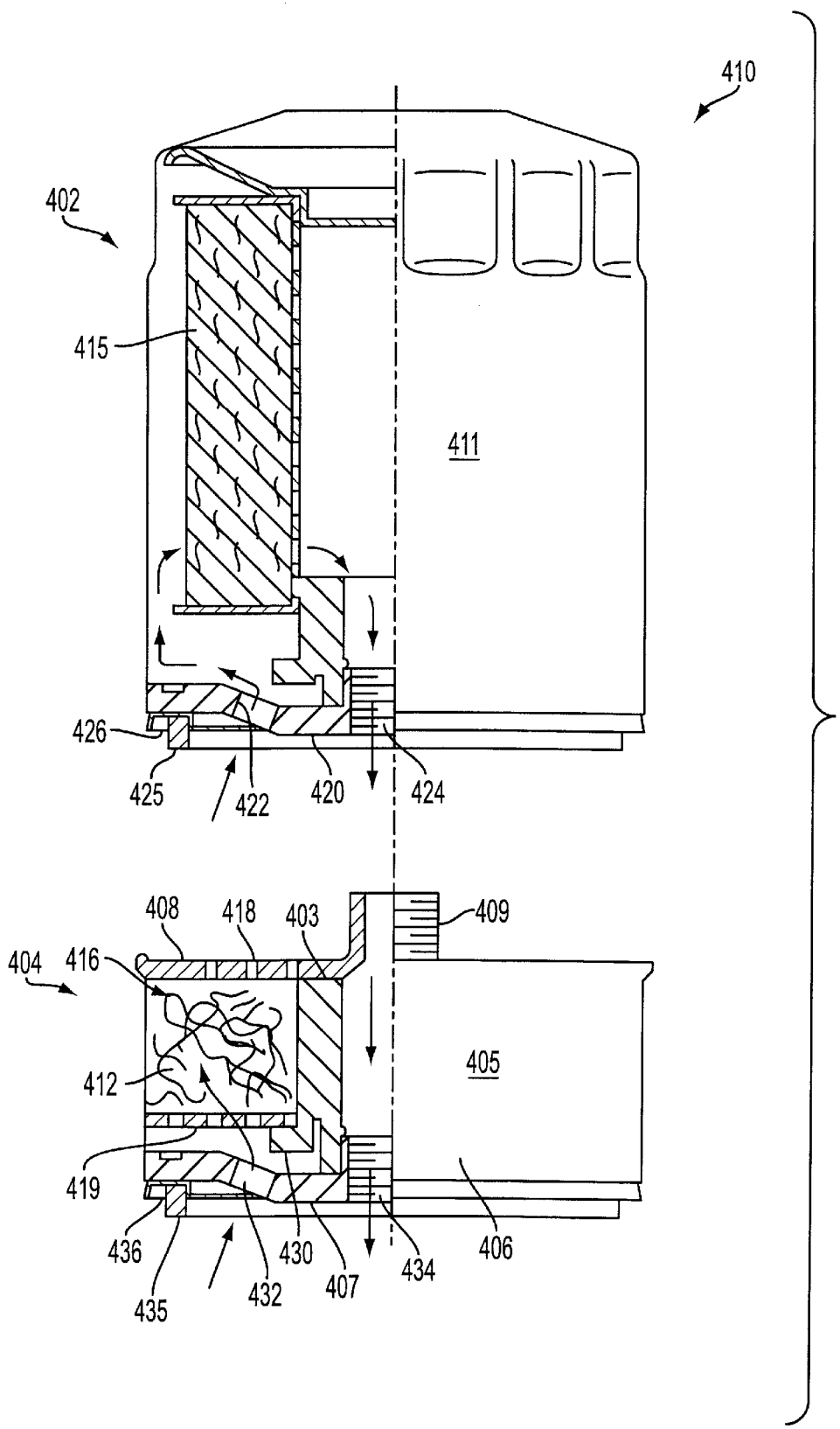
FIG. 10 is a side plan view, partially in cross-section, of a two-piece modular oil filter according to a fifth embodiment of the invention.

Referring now to FIG. 10, an oil filter assembly 410 in accordance with a fifth embodiment of the present invention is shown. The oil filter assembly 410 in this embodiment includes two parts, a primary oil filter 402 shown on top in the drawing, and a supplemental cartridge 404, shown below the primary filter.

The primary oil filter 402 incorporates a mechanically active filter element 415 within a cylindrical housing 411. The primary oil filter 402 further includes a base plate 420, which includes a plurality of inlet ports 422 arranged in a circular pattern as well as a central outlet port 424. The base plate 420 is provided as an integral part of the cylindrical housing 411, and an annular sealing member 425 fits engagingly into a groove 426 formed at the bottom surface of the base plate. The outlet port 424 has a plurality of female threads formed therein to allow rotatable mounting of the filter 402 on an externally threaded hollow tubular male connector fitting 409 of the supplemental cartridge 404.

The supplemental cartridge 404 is made to rotatably and threadably attach to an externally threaded hollow tubular fitting on an engine block (not shown), and to then have the primary filter 402 rotatably and threadably fit thereon. The supplemental cartridge 404 includes a cylindrical housing 405 having a side wall 406, a base plate 407, sealably connected to the bottom edge of the side wall, and a cover plate 408 sealably connected to the top edge of the side wall.

The cover plate 408 has a plurality of outlet openings 418 formed therein, in the area thereof above the chemically active filter member 416, to allow oil to flow outwardly from the supplemental cartridge 404 and then into the inlets 422 of the primary oil filter 402.

The base plate 407 of the supplemental cartridge 404 includes a plurality of inlet ports 432, arranged in a circular pattern, as well as a central outlet port 434. The base plate 407 is provided as an integral part of the cylindrical housing 405, and an annular sealing member 435 fits engagingly into a groove 436 formed at the bottom surface of the base plate. The outlet port 434 has a plurality of female threads formed therein to allow rotatable mounting of the supplemental cartridge 404 to an externally threaded hollow tubular fitting on an engine block (not shown)

The hollow tubular male connector fitting 409, which is externally threaded, is provided at the center of the cover plate 408, and a cylindrical dividing wall member 403 is centrally disposed within the cartridge housing 405, and forms a fluid seal at the top and bottom surfaces thereof, to effectively separate the interior of the housing into inlet and outlet passages, which do not communicate directly with one another unless the hydraulic pressure within the inlet passage exceeds a predetermined level. The cylindrical dividing wall member 403 is preferably made of an oil-tolerant elastomer. The cylindrical dividing wall member 403 defines an inlet flow path on the outside thereof, and an outlet flow path on the inside thereof and in communication with the outlet port 434.

The supplemental cartridge 404 contains a chemically active filter element 416 therein. The chemically active filter element 416 includes a nonwoven fiber web 412, and a chemical reagent associated with the nonwoven fiber web 412. The chemically active filter element 416 is retained within the inlet passage inside the cartridge housing 405, and disposed radially outside of the cylindrical dividing wall member 403.

Also in this embodiment, a porous, annular lower mesh screen 419 may, optionally, be placed below the chemically active filter element 416 to retain the fiber web 412 of the chemically active filter element thereabove. Where used, the mesh screen 419 may rest on a transverse horizontal flange 430, which is an integral part of the cylindrical dividing wall member 403.

When the primary oil filter 402 is attached to the supplemental cartridge 404, and when the entire assembly 410 is considered as a whole, the chemically active filter element 416 is disposed below the mechanically active filter element 415 of the primary oil filter 402, and therefore precedes the mechanical filter element in the flow path, in order to allow oil to interact with the chemically active filter element 416 prior to mechanical filtration. This design ensures that the oil will pass completely through the chemically active filter element 416 before it reaches the mechanically active filter element 415.

Figure 11:
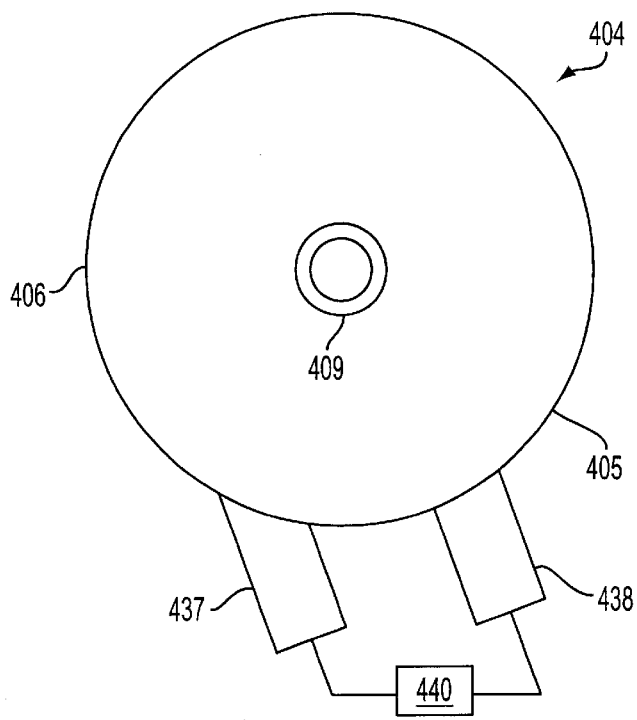
FIG. 11 is a top plan view of a supplemental cartridge, which is one component of the filter of FIG. 10.

Optionally, as shown in FIG. 11, the supplemental cartridge 404 may include a pair of hollow tubes 437, 438 attached to the side wall 406 thereof, which communicate with the interior of the cartridge housing 405. Where used, these tubes 427, 438 are provided to allow connection of the supplemental cartridge to a heat exchanger 440 to allow cooling of oil as it passes therethrough.

Sixth Preferred Embodiment

Figure 12:
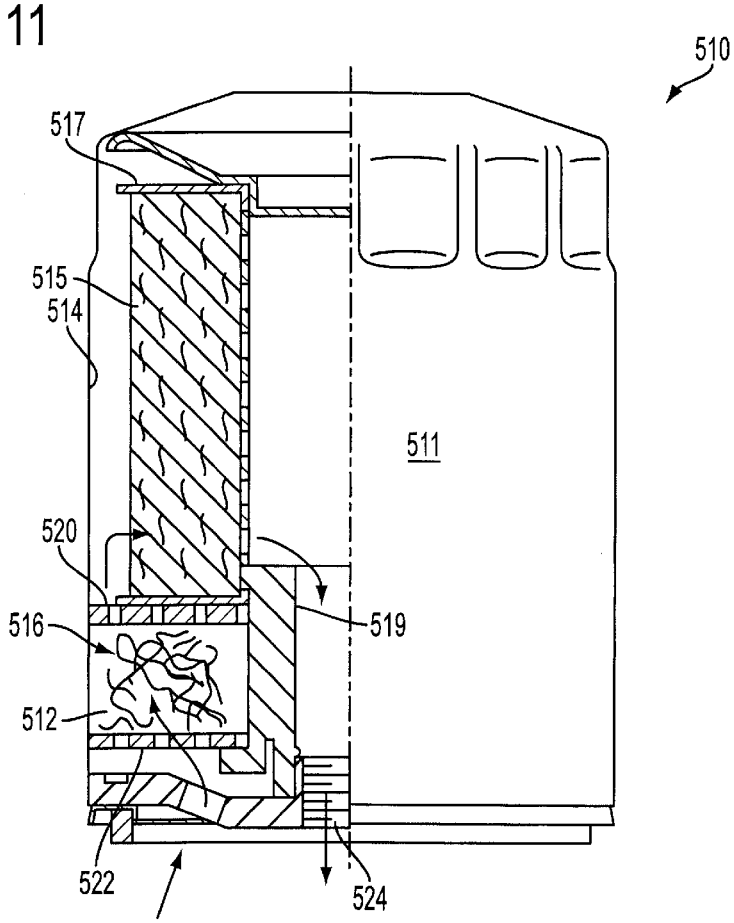
FIG. 12 is a cross-sectional view of an oil filter in accordance with a sixth embodiment of the invention.

Referring now to FIG. 12, an oil filter 510 in accordance with a sixth embodiment of the present invention is shown. With the exception of the configuration and placement of the respective mechanical and chemical filter elements 515, 516 and related components, and unless otherwise specified in this section, the oil filter 510 is substantially identical to the oil filter 10 of the first embodiment, as described hereinabove.

The oil filter 510 in this embodiment generally includes a hollow cylindrical housing 511 which defines a chamber 514 therein, a porous mechanically active filter element 515 within that chamber, and a chemically active filter element 516, made up of a nonwoven fiber web 512 having a chemical reagent associated therewith, also retained within the chamber 514 inside the housing and disposed below and sequentially before the mechanically active filter element in the flow path. Once again the flow path through the filter 510 is shown by the arrows in the drawing.

In the embodiment 510 of FIG. 12, the mechanically active filter element 515 is a conventional cylindrical member made of accordion-pleated filter paper. A selectively foraminous cylindrical screen or support frame 517 may, optionally, be provided within the housing 511 to supportively hold the mechanically active filter element 515 therein. A substantially cylindrical seal or grommet 519 is provided within the housing 511 and surrounding an outlet port 524 thereof, to help control the flow path of oil through the filter 510. The grommet 519 defines an inlet flow path on the outside thereof, and an outlet flow path on the inside thereof in communication with the outlet port 524.

Also in this embodiment, porous annular upper and lower foraminous dividers 520, 522, respectively, may optionally be placed above and/or below the chemically active filter element 516 to retain the chemically active filter element therebetween. The dividers 320 or 322 may be selectively foraminous solid plates, or alternatively, may be mesh screens. The upper divider 520, where used, is constructed and arranged to pass oil only to the outside surface of the mechanically active filter element 515, so that the oil must be mechanically filtered before exiting the filter 510.

The chemically active filter element 516 is also provided in the approximate shape of a cylinder in this embodiment, and is disposed below the mechanically active filter element 515 in the inlet flow path. In this embodiment 510 the chemically active filter element precedes the mechanical filter element in the flow path, in order to allow chemical modification of acids or other unwanted contaminants which may be present in the oil, with the basic material or other reagent of the chemically active filter element 516, prior to mechanical filtration. This design ensures that the oil will pass completely through the chemically active filter element before it reaches the mechanically active filter element.

Seventh Preferred Embodiment

Figure 13:
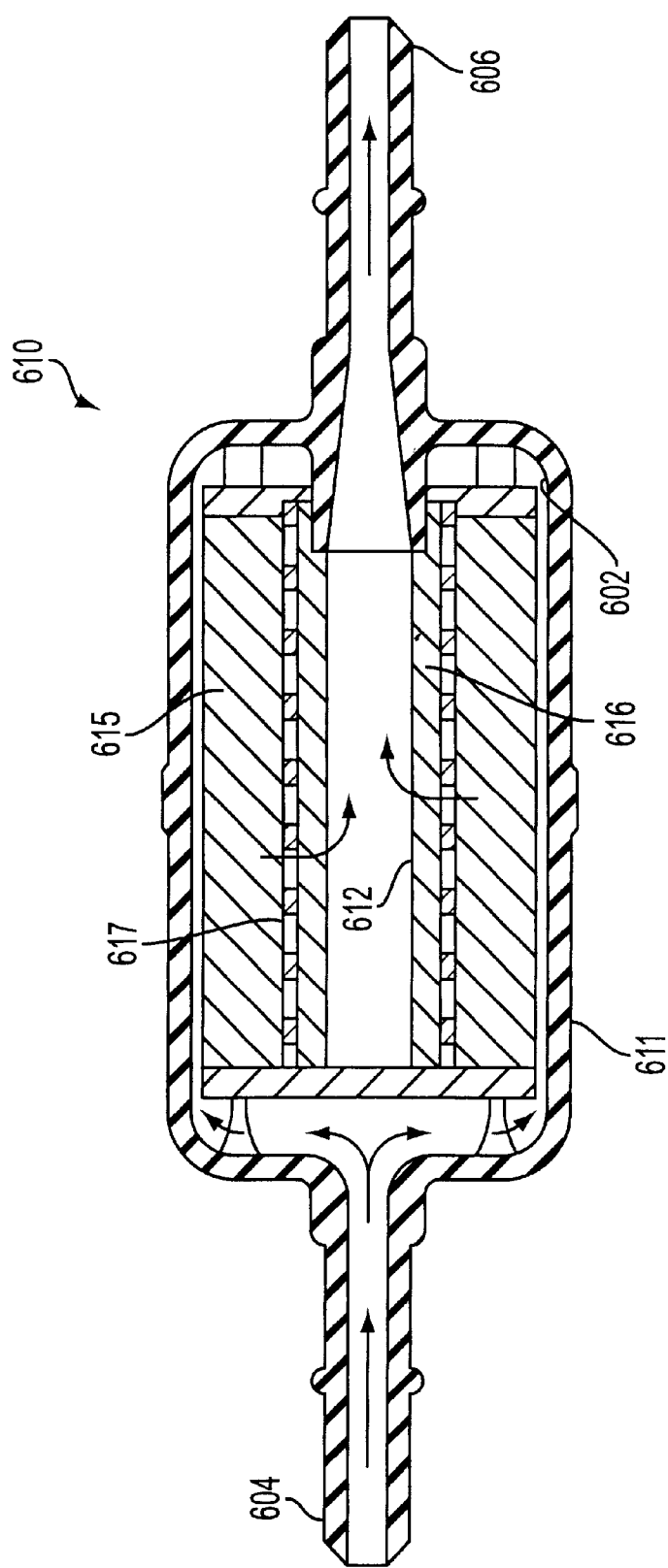
FIG. 13 is a cross-sectional view of an in-line fluid filter in accordance with a seventh embodiment of the invention.

Referring now to FIG. 13, a seventh preferred embodiment of the invention is shown in the form of an in-line fluid filter 610. This type of in-line filter may be used for gasoline, for diesel fuel, of for other fluids, as needed. The path of fluid flow, through the filter 610, is shown by the arrows in the drawing.

This embodiment of the invention includes a hollow casing 611 having an inlet 604 and an outlet 606 and defining a hollow space 602 therein, which houses a mechanically active filter element 615, a chemically active filter element 616, and an optional foraminous cylindrical frame member 617 located between the two filter elements.

In the embodiment of FIG. 13, the chemically active filter element 616 includes a non-woven fiber web 612 located radially internally within the mechanically active filter element 615, and is also coaxially mounted radially inside of and attached to the frame member 617, in order to most effectively release a chemical additive from the fiber web 612 into the liquid being filtered. Locating the chemically active filter element 616 in this way minimizes the likelihood that the released additive will be removed by the mechanically active filter element 615 immediately after its release.

In this embodiment of the filter 610, the material making up the fiber web 612 is substantially identical to the fiber web 12 of the first embodiment as described herein, except for the size and shape of the web, the location thereof within the filter, and the specific reagent selected to be placed within the fibers 20 thereof At a highly magnified level, this fiber web 612 is also the same as the web 12 illustrated in FIGS. 3–5.

The reagents used in the chemical filter 612 in this embodiment are selected for their specific application, depending on the type of fluid to be filtered thereby. When used in connection with diesel fuel or standard automotive fuel, suitable additives may be one or more compounds selected from the group consisting of injector cleaning additives, antimicrobial agents, octane boosters, compounds for removing entrained water, or other fuel additives known in the

Eighth Preferred Embodiment

Figure 14:
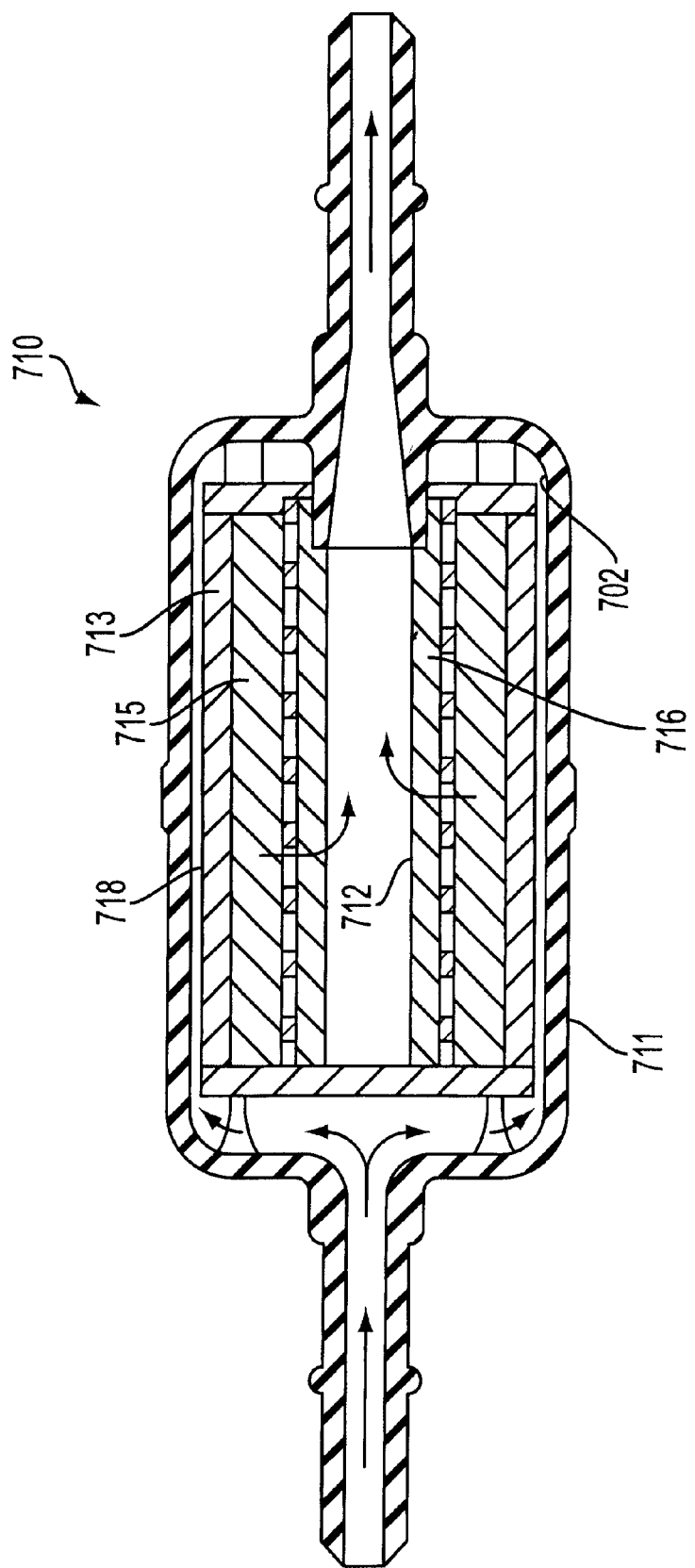
FIG. 14 is a cross-sectional view of another in-line fluid filter in accordance with an eighth embodiment of the invention.

Referring now to FIG. 14, an eighth preferred embodiment of the invention is shown in the form of another design for an in-line fluid filter 710. The path of fluid flow through the filter 710 is shown by the arrows in the drawing. This embodiment of the invention includes a hollow casing 711 having an inlet 704 and an outlet 706 and defining a hollow space 702 therein, which houses a first chemically active filter element 716 including a first fiber web 712, a mechanically active filter element 715, a second chemically active filter element 718 including a second fiber web 713, and an optional foraminous cylindrical frame member 717 located between the first chemically active filter element and the mechanically active filter element.

In the embodiment of FIG. 14, the first chemically active filter element 716 is located radially internally within the mechanically active filter element 715, and is also coaxially mounted radially inside of and attached to the frame member 717, in order to most effectively release a chemical additive from the first fiber web 712 into the liquid being filtered. Locating the chemically active filter element 716 in this way minimizes the likelihood that the released additive will be removed by the mechanically active filter element 715 immediately after its release. In contrast, the second chemically active filter element 718 is located coaxially and radially external to the mechanically active filter element 715, in order to remove contaminants from the fluid passing therethrough.

In this embodiment of the filter 710, the material making up each of the respective fiber webs 712, 713 of the respective chemically active filter elements 716, 718 is substantially identical to the fiber web 12 of the first embodiment as described herein, except for the size and shape of the web, the location thereof within the filter, and the specific reagent selected to be placed within the fibers 20 thereof At a highly magnified level, these fiber webs 712, 713 are each also the same as the web 12 illustrated in FIGS. 3–5.

The reagents used in the first chemical filter 716 in this embodiment are selected for their application in connection with the fluid being filtered thereby. In an application for filtering diesel fuel or standard automotive fuel, these reagents may be the same additives discussed above in connection with the embodiment of FIG. 14. Preferably, the second chemically active filter element 718 is provided with a chemical reagent that has the capability to attract and to bind any water molecules which might be present in the fuel.

Although the present invention has been described herein with respect to a preferred embodiment thereof, the foregoing description is intended to be illustrative, and not restrictive. Those skilled in the art will realize that many modifications of the preferred embodiment could be made which would be operable. All such modifications, which are within the scope of the claims, are intended to be within the scope and spirit of the present invention.

What is claimed is:

1. A fluid filter comprising:

a casing defining a hollow space therein;

a porous mechanically active filter element retained within said casing hollow space; and a first chemically active filter element retained within said casing hollow space and comprising a nonwoven fiber web;

wherein said nonwoven fiber web comprises a plurality of elongated fibers with each said fiber having an outer surface;

each of said fibers further including a longitudinally extending internal cavity formed therein, and having a longitudinally extending slot formed therein extending from the internal cavity to the outer fiber surface; and a chemical reagent disposed within said internal cavities of said fibers.

2. A fluid filter as recited in claim 1, wherein each of said elongated fibers includes a central stem and a plurality of lobes extending outwardly from said central stem, with each said lobe including a longitudinally extending internal cavity on each side thereof, whereby a longitudinally extending slot is defined between adjacent lobes.

3. A fluid filter as recited in claim 1, wherein said first chemically active filter element is disposed on a first side of said mechanically active filter element, and further comprising a second chemically active filter element disposed on a second side of said mechanically active filter element substantially opposite said first chemically active filter element.

4. A fluid filter as recited in claim 3, wherein said first chemically active filter element has a first reagent in the fibers thereof, said first reagent comprising a compound selected from the group consisting of organic salts, inorganic salts, surfactants, alcohols, poly-alcohols, poly-glycols, amines, polyamines, polyimines, morpholines, oxazoline, polyether, piperazine, and mixtures thereof.

5. A fluid filter as recited in claim 4, wherein said second chemically active filter element has a second reagent in the fibers thereof, said second reagent comprising a compound selected from the group consisting of dispersants, antioxidants, friction modifiers, pour point depressants, corrosion inhibitors, detergents, viscosity index improvers, antiwear agents, and extreme pressure additives, and mixtures thereof.

6. A fluid filter as recited in claim 1, wherein said filter is an oil filter.

7. A fluid filter as recited in claim 6, wherein said reagent comprises a plurality of solid particles.

8. An oil filter as recited in claim 6, wherein said reagent is selected to react with soot particles.

9. An oil filter as recited in claim 6 wherein said reagent is a liquid.

10. An oil filter as recited in claim 9, wherein said longitudinally extending internal cavity in each said elongated fiber is dimensioned so that said liquid agent is retained within the cavity by capillary forces.

11. An oil filter as recited in claim 6 wherein said agent includes a compound selected from the group consisting of organic salts, inorganic salts, surfactants, alcohols, poly-alcohols, poly-glycols, polyamines, polyimines, amines, morpholines, oxazoline, polyether, and piperazine.

12. An oil filter as recited in claim 6 wherein said agent includes an acid neutralizing reagent.

13. An oil filter as recited in claim 12 wherein said neutralizing reagent includes a compound selected from the group consisting of calcium carbonate, sodium carbonate, magnesium carbonate, calcium hydroxide, sodium hydroxide, magnesium hydroxide, calcium oxide, magnesium oxide, zinc oxide, barium oxide, sodium aluminate, and mixtures thereof.

14. A fluid filter as recited in claim 1, wherein said filter is a fuel filter.

15. A fluid filter, comprising:
a hollow casing having a base plate for placement proximate a mounting surface, said base plate having an outlet aperture formed therethrough and an inlet aperture formed therethrough and spaced apart from said outlet aperture;
a mechanically active filter element disposed within said casing and spaced away from said base plate;
a substantially cylindrical dividing wall member disposed within said casing adjacent said base plate;
said dividing wall member defining an inlet flow channel on the outside thereof within the casing and in fluid communication with said inlet aperture of said base plate,
said dividing wall member further defining an outlet flow channel therein in fluid communication with said outlet aperture of said base plate; and
a chemically active filter member disposed within said inlet flow channel of said casing, said chemically active filter member comprising a nonwoven fiber web comprising a plurality of elongated fibers with each of said fibers having an outer surface;
each of said fibers further including a longitudinally extending internal cavity formed therein, and including a longitudinally extending slot formed therein extending from the internal cavity to the outer fiber surface; and chemical reagent disposed within said internal cavities of said fibers.

16. A supplemental cartridge for use in conjunction with a fluid filter, said supplemental cartridge comprising:
a hollow casing, comprising
a base plate for placement proximate a mounting surface, said base plate having an outlet aperture formed substantially centrally therethrough and an inlet aperture formed therethrough and spaced apart from said outlet aperture;
a cap opposite said base plate for placement proximate a fluid filter, said cap having an inlet aperture formed substantially centrally therethrough and an outlet aperture formed therethrough and spaced apart from said inlet aperture;
an outer wall connecting said cap and said base plate;
a substantially cylindrical dividing wall member disposed within said casing and separating said casing interior into an inlet flow channel in fluid communication with said inlet aperture of said base plate, and an outlet flow channel in fluid communication with said outlet aperture of said base plate; and
a chemically active filter member disposed within said inlet flow channel of said casing, said chemically active filter member comprising a nonwoven fiber web comprising a plurality of elongated fibers with each said fiber having an outer surface;
each of said fibers further including a longitudinally extending internal cavity formed therein, and including a longitudinally extending slot formed therein extending from the internal cavity to the outer fiber surface; and
a chemical reagent disposed within said internal cavities of said fibers.

17. The supplemental cartridge of claim 16, further comprising:
an auxiliary inlet tube attached to said outer wall of said casing and in fluid communication with said inlet flow channel thereof; and
an auxiliary outlet tube attached to said outer wall of said casing and in fluid communication with said interior thereof.

18. A method for removing contaminants from lubricating oil within an engine, said method comprising the steps of:
circulating said lubricating oil through an engine;
passing said lubricating oil into an oil filter comprising:
a casing defining a hollow space therein;
a porous mechanically active filter element retained within said space; and
a chemically active filter element comprising a nonwoven web of fibers retained within said space, said web comprising:
a plurality of elongated fibers, with each said fiber having an outer surface and a longitudinally extending internal cavity formed therein with a slot formed therein which extends longitudinally along the surface of the fiber between the internal cavity and the outer fiber surface; and
a reagent retained within the internal cavities of said elongate fibers, said reagent tending to react with contaminants which may be present in said lubricating oil; and circulating said lubricating oil within said oil filter through said nonwoven web of fibers.

19. A method for removing contaminants from lubricating oil within an engine as recited in claim 18, wherein said contaminants include soot.

20. A method for removing contaminants from lubricating oil within an engine as recited in claim 18, wherein said contaminants include combustion acids.

21. A method for supplying an additive to lubricating oil, comprising the steps of circulating said lubricating oil through an engine;

passing said lubricating oil through an oil filter comprising:

a casing defining a hollow space therein;

a porous, mechanically active filter element retained within said space; and a chemically active filter element comprising a nonwoven web of fibers retained within said space, said web comprising:

a plurality of elongated fibers, with each said fiber having an outer surface and a longitudinally extending internal cavity formed therein with a slot formed therein which extends longitudinally along the surface of the fiber between the internal cavity and the outer fiber surface; and an oil additive disposed within the internal cavities of said elongate fibers, whereby an amount of said additive is transferred into said lubricating oil.

22. A method for supplying an additive to lubricating oil as recited in claim 21, wherein said additive comprises a compound selected from the group consisting of dispersants, antioxidants, friction modifiers, pour point depressants, corrosion inhibitors, detergents, viscosity index improvers, antiwear agents, extreme pressure additives, and mixtures thereof.

\* \* \* \* \*